United States Patent [19]

Brown et al.

[11] 4,400,704

[45] Aug. 23, 1983

[54] PLOTTER HAVING CONTINUOUSLY MOVING CARBON PAPER HANDLING SYSTEM

[75] Inventors: Henry C. Brown; Fredrick N. Mueller, both of Dallas, Tex.

[73] Assignee: Camsco, Inc., Richardson, Tex.

[21] Appl. No.: 366,167

[22] Filed: Apr. 7, 1982

[51] Int. Cl.³ .................. G01D 9/00; G01D 15/24; B41J 3/28

[52] U.S. Cl. .................................... 346/29; 346/136; 400/38

[58] Field of Search .............. 346/1.1, 134, 136, 29; 400/38, 42

[56] References Cited

U.S. PATENT DOCUMENTS

| | | | |
|---|---|---|---|
| 669,627 | 3/1901 | Eylar | 400/38 |
| 1,254,592 | 1/1918 | Hanners | 400/38 X |
| 1,373,870 | 4/1921 | Downey | 400/38 |
| 1,490,692 | 4/1924 | Biesen et al. | 400/38 |
| 1,621,265 | 3/1927 | Mannhardt et al. | 400/38 |
| 1,679,827 | 8/1928 | Jensen | 400/38 |
| 1,949,173 | 2/1934 | Miller | 400/42 |
| 2,080,803 | 5/1937 | Borchers | 400/498 |
| 3,391,841 | 7/1968 | Miner | 346/136 UX |

*Primary Examiner*—Donald A. Griffin
*Attorney, Agent, or Firm*—Richards, Harris & Medlock

[57] ABSTRACT

A plotting system (10) including a plotting device (40) for plotting on paper (52) is provided. The plotting system (10) includes a work surface (28). A supply source (50) of paper (52) to be plotted is disposed adjacent the work surface (28). A take-up roll (56) is disposed adjacent the work surface (28) opposite the supply source (50). A supply source (64) of carbon paper (66) is disposed adjacent to the work surface (28). A take-up roll (72) is disposed adjacent the work surface (28) opposite the supply source (64). Structure (60) is interconnected to the first take-up roll (56) for periodically advancing the paper (52) across the work surface (28) from the supply source (50) to the take-up roll (56). Structure is interconnected to the second take-up roll (72) for continuously advancing the carbon paper (66) across the work surface (28) from the supply source (64) to the second take-up roll (72) while the plotting device (40) plots on the paper (52).

7 Claims, 1 Drawing Figure

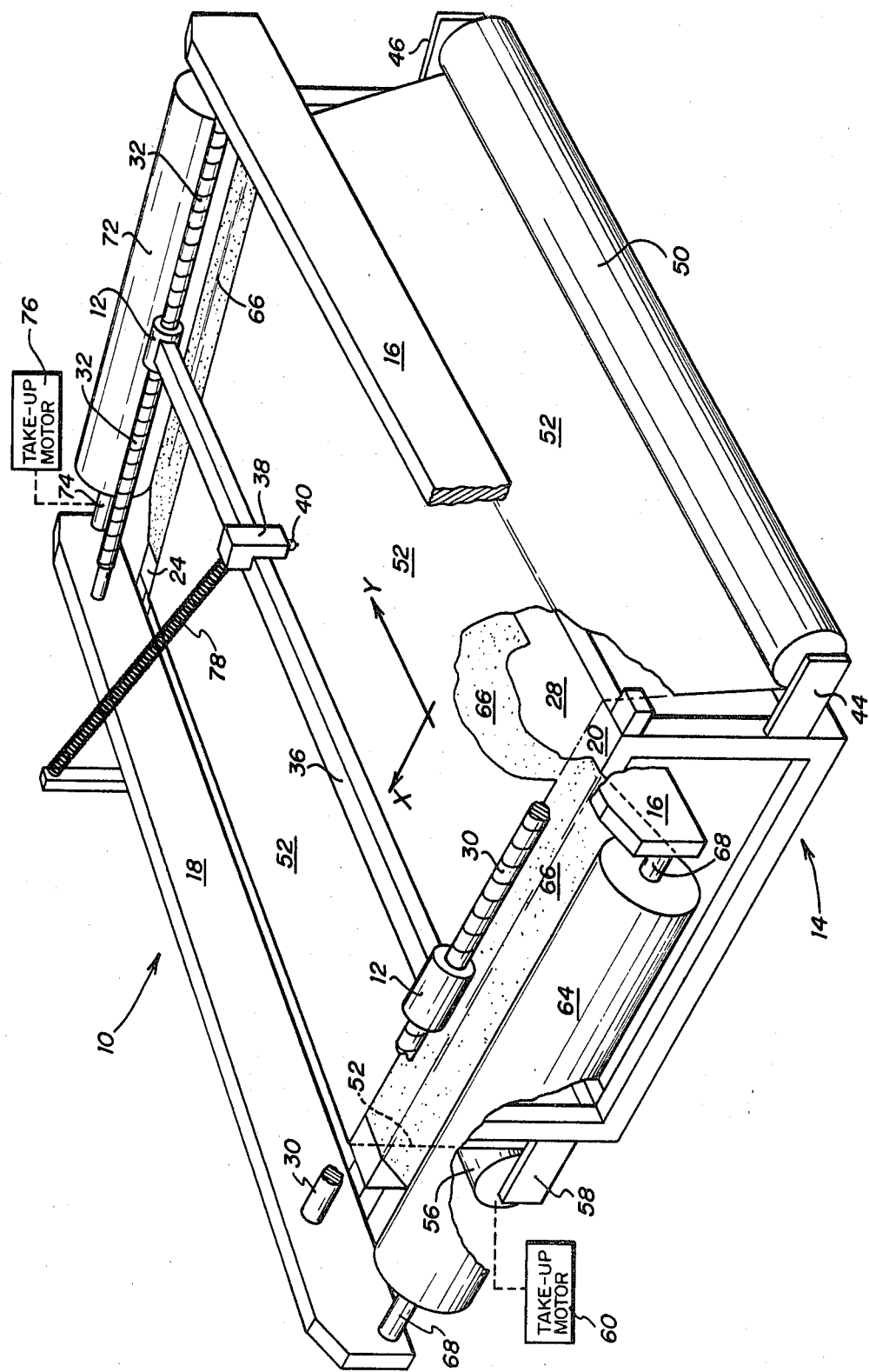

PLOTTER HAVING CONTINUOUSLY MOVING CARBON PAPER HANDLING SYSTEM

TECHNICAL FIELD

This invention relates to plotting devices, and more particularly to a plotter having a continuously moving carbon paper handling system.

BACKGROUND ART

Automatically controlled instrument systems having carriages which move in two coordinate directions over a work surface of a table are well known. Such systems are used in combination with a plotter for plotting data and information such as, for example, graphical representations of apparel pattern pieces for the plotting of an apparel pattern marker for use in the cutting of fabric in the production of garments. Such a numerical control system is illustrated in U.S. Pat. No. 3,887,903, issued to Martell on June 3, 1975 and entitled "Interactive Man-Machine Method and System For Grading Pattern Pieces and For Producing an Apparel Marker".

Additionally, such plotting systems are utilized for generating a hectographic master or stencil for use in a hectographic reproduction process. The use of a hectograph and the hectographic stencil permits copies of the plotted information to be reproduced. In the process of generating a hectographic stencil, hectographic carbon is transferred from carbon paper to the paper which is being plotted. During the process of plotting the paper, a sticktion or adherence force is generated between the paper and hectographic carbon paper due to the transfer of carbon from the hectographic carbon paper to the plotted paper. This sticktion force must be overcome before the plotted paper or hectographic stencil can be moved from the work surface. It has been found that the adherence force between the hectographic carbon paper and the plotted paper may average one ounce of shear force per inch of line plotted. That is, pulling on the hectographic carbon paper after a 16 inch long line has been plotted, requires approximately one pound of force on the hectographic carbon paper in order to separate the hectographic carbon paper from the plotted paper.

Previously developed plotters for use in plotting a hectographic master have required structure for physically separating the hectographic master from the hectographic carbon paper in order to advance the hectographic master from the work surface. In such systems, after completion of each hectographic master, the master and hectographic carbon paper must be separated before each can be advanced. Furthermore, such previously developed systems have required clamping devices for holding the hectographic carbon paper on the work surface.

A need has thus arisen for a plotting system for the generation of a hectographic master in which forces generated between the plotting paper and the hectographic carbon paper are minimized to thereby eliminate the need for separating devices and allow hectographic masters to be generated quickly and easily. A need has further arisen for a plotting system including a carbon paper handling system which eliminates the need for clamping devices to clamp the carbon paper to the work surface. A need has further arisen for a carbon paper handling system for use in a plotter in which total utilization of the carbon is ensured by operation of the system.

DISCLOSURE OF THE INVENTION

In accordance with the present invention, a carbon paper handling system for use with a plotter for generating a hectographic stencil is provided which substantially eliminates the problems heretofore associated with such plotting systems, including a build up of forces between the hectographic stencil and hectographic carbon paper.

In accordance with the present invention, a plotting system includes a plotting device for plotting on paper and a work surface. A supply source of paper to be plotted is disposed adjacent the work surface. A take-up device is disposed adjacent the work surface opposite the supply source of paper. A supply source of carbon paper is disposed adjacent the work surface. A second take-up device is disposed adjacent the work surface opposite the supply source of carbon paper. Structure is interconnected to the first take-up device for periodically advancing the paper across the work surface from the supply source of paper to the first take-up device. Structure is interconnected to the second take-up device for continuously advancing the carbon paper across the work surface from the carbon paper supply source to the second take-up device while the plotting device plots on the paper.

In accordance with another aspect of the present invention, a plotting system is provided having a plotting device in which a continuous web of paper to be plotted is spread on a supporting surface of a table. The paper traverses the table from a supply location to a take-up location. A continuous web of carbon paper is provided and is spread on the supporting surface of the table such that the carbon paper traverses the table from a supply location to a take-up location. Structure is provided for periodically advancing the paper across the surface of the table from the supply location to the take-up location. Structure is also provided for continuously advancing the carbon paper across the surface of the table from the supply location to the take-up location while the plotting device plots on the paper.

In accordance with another aspect of the present invention, a system for plotting information on paper supported on a work surface is provided. The system includes a plotting device movable over the work surface in which carbon paper is utilized for generating a hectographic stencil. The system includes structure for periodically advancing the paper across the surface. Structure is provided for continuously advancing the carbon paper across the work surface as the plotting device moves over the work surface to thereby plot the information on the paper and generate the hectographic stencil.

In accordance with yet another aspect of the present invention, a method is provided for generating a hectographic stencil. The method includes the steps of periodically advancing the paper across the work surface and continuously advancing carbon paper across the work surface as the paper is being plotted to generate the hectographic stencil.

BRIEF DESCRIPTION OF THE DRAWING

For a more complete understanding of the present invention and for further advantages thereof, reference is now made to the following Detailed Description, taken in conjunction with the accompanying Drawing which is a perspective view of a plotting system utilizing the present carbon paper handling system.

DETAILED DESCRIPTION

Referring to the FIGURE, a perspective view of a plotting system utilizing the carbon paper handling system of the present invention is illustrated and is generally identified by the numeral 10. Plotting system 10 may be used for plotting a graphical representation of informational data on paper for generating a hectographic master or stencil utilized in a hectograph for generating reproduction copies of the plotted information.

Plotting system 10 includes a longitudinal carriage 12 which is mounted adjacent a table 14. Table 14 includes sides 16 and 18 and ends 20 and 24. Table 14 includes a work surface 28.

Carriage 12 is mounted to and indexes on table 14 utilizing lead screws 30 and 32 mounted between sides 16 and 18. Carriage 12 is thus slidable for movement along the longitudinal or "X" coordinate direction to traverse table 14.

Carriage 12 supports a beam 36. Mounted to beam 36 for slidable movement thereon is an instrument carriage 38 which supports a pen 40. Instrument carriage 38 moves in a direction traverse to the movement of carriage 12 to cross table 14 in a direction perpendicular to the movement of longitudinal carriage 12 or in a "Y" coordinate direction relative to table 14. The combined movement of longitudinal carriage 12 and instrument carriage 38 permits pen 40 to be moved to any position on work surface 28 of table 14.

Mounted adjacent side 16 of table 14 utilizing brackets 44 and 46 is a supply roll 50 of plain plotting paper 52. Supply roll 50 provides a paper supply source for plotting system 10. Paper 52 extends across work surface 28 of table 14 to a take-up roll 56. Take-up roll 56 is supported adjacent side 18 of table 14 utilizing a bracket 58. Paper 52 is advanced across work surface 28 of table 14 from supply roll 50 to take-up roll 56 utilizing a take-up motor 60 interconnected to take-up roll 56.

Disposed adjacent end 20 of table 14 is a supply roll 64 of hectographic carbon paper 66. Supply roll 64 is mounted between sides 16 and 18 of table 14 utilizing a shaft 68. Mounted adjacent table end 24 of table 14 is a carbon paper take-up roll 72. Carbon paper take-up roll 72 is mounted between table sides 16 and 18 using a shaft 74. Hectographic carbon paper 66 traverses work surface 28 of table 14 in the "Y" coordinate direction from supply roll 64 to carbon paper take-up roll 72 under the control of a motor 76 for driving carbon paper take-up roll 72.

In operation of the present plotting system, hectographic carbon paper 66 is placed on work surface 28 of table 14 such that the noncarbon surface lies adjacent work surface 28. Paper 52 is then placed on top of hectographic carbon paper 66 between supply roll 50 and take-up roll 56. Through operation of longitudinal carriage 12 and instrument carriage 38, pen 40 traverses work surface 28 to plot the information or data on paper 52. The positioning of pen 40 is controlled by a computer (not shown) which is interconnected to instrument carriage 38 via a cable 78.

As pen 40 annotates and plots on paper 52, the hectographic carbon from carbon paper 66 is transferred to the underside of paper 52. Paper 52 thereafter can be utilized as a hectographic master or stencil. After paper 52 has been plotted upon, paper 52 traverses work surface 28 of table 14 and is re-rolled on take-up roll 56 for subsequent use in the hectographic reproduction process. While pen 40 plots on paper 52, paper 52 is stationary on work surface 28 of table 14.

An important aspect of the present invention is the movement of hectographic carbon paper 66 during the plotting process. Hectographic carbon paper 66 continuously traverses work surface 28 of table 14 as pen 40 moves over work surface 28 in the plotting process. The continuous movement of hectographic carbon paper 66 during the plotting process substantially eliminates the adherence forces generated as the hectographic carbon is transferred from hectographic carbon paper 66 to the underside of paper 52 during plotting. The continuous movement of hectographic carbon paper 66 traversing work surface 28 from supply roll 64 to carbon paper take-up roll 72 prevents force build up between hectographic carbon paper 66 and paper 52.

The continuous movement of hectographic carbon paper 66 thereby eliminates the need for physical separating devices in order to separate paper 52 from hectographic carbon paper 66 when the plotting operation has been completed. Once pen 40 has completed the plotting operation, take-up roll 56 is energized by take-up motor 60 to advance paper 52 across work surface 28 in order to bring a fresh portion of paper 52 from supply roll 50 onto work surface 28. The periodic advancement of paper 52 across work surface 28 after the completion of each plotting operation is accomplished without the use of any separating mechanisms due to the continuous advancement of hectographic carbon paper 66 from supply roll 64 to carbon paper take-up roll 72 during the plotting operation.

The continuous movement of hectographic carbon paper 66 across work surface 28 also ensures that there is a total utilization of the hectographic carbon contained on hectographic carbon paper 66 during the plotting operation. The carbon will be completely transferred to paper 52 before hectographic carbon paper 66 is rewound on take-up roll 72.

The speed of the continuously moving hectographic carbon paper 66 is adjustable to thereby permit a selectable speed based upon the density of the pattern to be plotted by pen 40. The matching of the speed of hectographic carbon paper 66 to the density of the plotted pattern ensures complete utilization of the carbon. The speed of hectographic carbon paper 66 may vary from, for example, ⅛ inch per minute to approximately, for example, one inch per minute.

The continuous movement of hectographic carbon paper 66 during the plotting operation further creates a tension between supply roll 64 and carbon paper take-up roll 72 to eliminate the need for clamping devices to hold hectographic carbon paper 66 against work surface 28.

Additional controls may be utilized with the present plotting system 20 such as, for example, automatic detectors for detecting the amount of hectographic carbon paper 66 remaining on supply roll 64. Alarms may be generated to attract an operator's attention as to the low supply of hectographic carbon paper 66 remaining on supply roll 64. Additionally, the entire plotting operation may be terminated when a predetermined amount of hectographic carbon paper 66 remains on supply roll 64. Additionally, the continuous movement of hectographic carbon paper 66 traversing work surface 28 may be terminated if the plotting operation by pen 40 stops for a predetermined period of time. In this manner, further savings of hectographic carbon paper 66 is accomplished.

It therefore can be seen the continuous movement of hectographic carbon paper 66 during the plotting operation substantially eliminates the adherence or sticktion forces between paper 52 and hectographic carbon paper 66 during the plotting operation. The elimination of the adherence force permits paper 52 to be periodically advanced over work surface 28 after completion of the plotting operation by pen 40. Furthermore, the use of the present carbon paper handling system eliminates the need for separating devices for separating paper 52 from hectographic carbon paper 66 as well as eliminating the need for clamping devices for maintaining hectographic carbon paper 66 adjacent work surface 28. The resulting system has increased reliability, better maintenance capability and is less expensive than previously developed systems.

Although the present plotting system 10 and carbon paper handling system have been described for the generation of a hectographic master or stencil, the present plotting system 10 can also be utilized for simultaneously generating duplicate copies of the plotted information by using interleaved multiple layers of paper 52 with carbon paper. In such a system, multiple supply rolls 50 and take-up rolls 56 may be utilized or multiple layers of paper 52 may be rolled on one supply roll 50. Carbon paper would then be placed between the layers of paper 52 with the carbon side disposed for transferring carbon to the paper 52 disposed beneath the carbon paper. In this manner, plotting system 10 would function as a manifolding device.

Although paper supply roll 50 and carbon paper supply roll 64 have been illustrated as being disposed on side 16 and end 20 of table 14 with the corresponding take-up roll disposed on the opposite side or end, respectively, both supply roll 50 and supply roll 64 may be disposed on the same side or end of table 14 without effecting the operation of the present invention.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A plotting system including a plotting device for plotting on paper comprising:
   a work surface having opposed ends and sides;
   a supply source of paper to be plotted disposed adjacent said work surface;
   first take-up means disposed adjacent said work surface opposite said supply source of paper;
   a supply source of carbon paper disposed adjacent said work surface;
   second take-up means disposed adjacent said work surface opposite said supply source of carbon paper;
   means interconnected to said first take-up means for periodically advancing the paper across said work surface from said supply source of paper to said first take-up means; and
   means interconnected to said second take-up means for continuously advancing the carbon paper across said work surface from said carbon paper supply source to said second take-up means while the plotting device plots on the paper.

2. The plotting system of claim 1 wherein said supply source of paper and said first take-up means are disposed adjacent said work surface opposed sides and said supply source of carbon paper and said second take-up means are disposed adjacent said work surface opposed ends.

3. A plotting system having a plotting device in which a continuous web of paper to be plotted is spread on a supporting surface of a table, wherein the paper traverses the table from a supply location to a take-up location and wherein a continuous web of carbon paper is spread on the supporting surface of the table, wherein the carbon paper traverses the table from a supply location to a take-up location, comprising:
   first means for periodically advancing the paper across the surface of the table from the supply location to the take-up location; and
   second means for continuously advancing the carbon paper across the surface of the table from the supply location to the take-up location while the plotting device plots on the paper.

4. The plotting system of claim 3 wherein:
   said first means advances the paper across the surface of the table in a first direction and said second means advances the carbon paper across the surface of the table in a second direction perpendicular to said first direction.

5. A system for plotting information on paper supported on a work surface and including a plotting device movable over the work surface and wherein carbon paper is utilized for generating a hectographic stencil comprising:
   means for periodically advancing the paper across the work surface; and
   means for continuously advancing the carbon paper across the work surface as the plotting device moves over the work surface to thereby plot the information on the paper and generate the hectographic stencil, such that forces generated between the paper and the carbon paper as the paper is plotted are minimized to enable the plotted paper to be periodically advanced across the work surface.

6. A plotting system for plotting a hectographic stencil on paper supported on a work surface and including a plotting device movable over the work surface wherein hectographic carbon paper is disposed between the paper and the work surface comprising:
   means for periodically advancing the paper across the work surface; and
   means for continuously advancing the hectographic carbon paper across the work surface as the plotting device moves over the work surface to thereby minimize forces generated between the hectographic carbon paper and the paper as the paper is plotted.

7. A method for generating a hectographic stencil comprising the steps of:
   periodically advancing paper across a work surface; and
   continuously advancing carbon paper across the work surface as the paper is being plotted to generate the hectographic stencil.

* * * * *